(12) United States Patent
Yoon et al.

(10) Patent No.: US 9,509,984 B2
(45) Date of Patent: Nov. 29, 2016

(54) THREE DIMENSIONAL IMAGE DISPLAY METHOD AND DEVICE UTILIZING A TWO DIMENSIONAL IMAGE SIGNAL AT LOW-DEPTH AREAS

(71) Applicant: SAMSUNG DISPLAY CO., LTD., Yongin, Gyeonggi-Do (KR)

(72) Inventors: Il Yong Yoon, Seoul (KR); Seon Ki Kim, Yongin-Si (KR)

(73) Assignee: SAMSUNG DISPLAY CO., LTD, Yongin, Gyeonggi-Do (KR)

( * ) Notice: Subject to any disclaimer, the term of this patent is extended or adjusted under 35 U.S.C. 154(b) by 126 days.

(21) Appl. No.: 14/487,972

(22) Filed: Sep. 16, 2014

(65) Prior Publication Data
US 2015/0304623 A1    Oct. 22, 2015

(30) Foreign Application Priority Data

Apr. 18, 2014  (KR) .................. 10-2014-0046960

(51) Int. Cl.
*H04N 13/04*    (2006.01)

(52) U.S. Cl.
CPC ...... *H04N 13/0456* (2013.01); *H04N 13/0454* (2013.01); *H04N 13/0404* (2013.01); *H04N 13/0445* (2013.01)

(58) Field of Classification Search
CPC .................. H04N 13/0022; H04N 13/0282; H04N 13/0292; H04N 13/0445–13/045; H04N 13/0456; H04N 13/0495
See application file for complete search history.

(56) References Cited

U.S. PATENT DOCUMENTS

| 7,295,264 | B2 | 11/2007 | Kim |
| 7,680,350 | B2 * | 3/2010 | Baxes ............ G06T 17/05 345/419 |
| 8,427,626 | B2 | 4/2013 | Takahashi et al. |
| 2009/0051685 | A1 * | 2/2009 | Takagi ........... H04N 13/004 345/419 |
| 2011/0096155 | A1 | 4/2011 | Choo et al. |

(Continued)

FOREIGN PATENT DOCUMENTS

| JP | 2010-231045 | 10/2010 |
| JP | 2012-093619 | 5/2012 |

(Continued)

OTHER PUBLICATIONS

Ming-Der Chou, et al., "P-77: A Novel 2-D/3-D Arbitrarily Switchable Autostereoscopic Display," pp. 1407-1410; SID of Digest, 2009.

(Continued)

*Primary Examiner* — Daniel Hajnik
(74) *Attorney, Agent, or Firm* — F. Chau & Associates, LLC (57) ABSTRACT

A 3D image display device includes a display unit including a display panel and an optical panel located at a front side of the display panel and changing a path of light. A controller is configured to generate a signal for controlling the display unit. The controller includes an image signal processor which generates an input image signal based on image information containing 2D image information and depth information. The image signal processor generates a 3D image signal based on the 2D image information and the depth information. The image signal processor extracts a low-depth area having a small depth and generates a 2D image signal corresponding to the low-depth area. The display unit displays the low-depth area by a 2D image.

16 Claims, 10 Drawing Sheets

(56) References Cited

U.S. PATENT DOCUMENTS

| | | |
|---|---|---|
| 2011/0141247 A1 | 6/2011 | Bai |
| 2011/0157167 A1* | 6/2011 | Bennett .................. G06F 3/14 345/419 |
| 2012/0194509 A1* | 8/2012 | Yun .................. H04N 13/0022 345/419 |
| 2012/0257018 A1* | 10/2012 | Shigemura ......... G02B 27/2214 348/46 |
| 2012/0268457 A1 | 10/2012 | Aso |
| 2013/0135298 A1* | 5/2013 | Isogai .................. G06T 15/205 345/419 |
| 2014/0157186 A1* | 6/2014 | Bhat .................. G06F 3/04815 715/782 |

FOREIGN PATENT DOCUMENTS

| | | |
|---|---|---|
| JP | 2012-191391 | 10/2012 |
| JP | 5182505 | 1/2013 |
| KR | 10-2008-0038666 | 5/2008 |
| KR | 10-2012-0088467 | 8/2012 |
| KR | 10-2013-0027932 | 3/2013 |

OTHER PUBLICATIONS

Ayako Takagi, et al., "30.3: Autostereoscopic Partial 2-D/3-D Switchable Display Using Liquid-Crystal Gradient Index Lens," pp. 436-439, SID of Digest, 2010.

* cited by examiner

2D image information

(a)

Depth information

1st sub-area (a)

2nd sub-area

(b)

3rd sub-area (c)

FIG. 11

THREE DIMENSIONAL IMAGE DISPLAY METHOD AND DEVICE UTILIZING A TWO DIMENSIONAL IMAGE SIGNAL AT LOW-DEPTH AREAS

CROSS-REFERENCE TO RELATED APPLICATION

This application claims priority to and the benefit of Korean Patent Application No. 10-2014-0046960 filed in the Korean Intellectual Property Office on Apr. 18, 2014, the entire contents of which are incorporated by reference herein.

TECHNICAL FIELD

The present invention relates to a display device, and more particularly, to a three dimensional image display device and a method of processing the three dimensional image.

DISCUSSION OF THE RELATED ART

Display devices may be capable of displaying a three-dimensional (3D) image. 3D images may be displayed using binocular disparity, which is the phenomenon by which different two-dimensional (2D) images are viewed by a viewer's left eye and a right eye and the viewer accordingly perceives a 3D image.

Examples of a 3D image display device using binocular disparity include a stereoscopic display device using specialized 3D glasses, such as shutter glasses and polarized glasses, and an autostereoscopic display device using a lenticular lens, a parallax barrier, and the like.

The autostereoscopic 3D image display device using the lenticular lens displays a left-eye view image and a right-eye view image on a common display panel, and an optical path of the image from the display panel is changed by using a lens to divide the image into the left-eye view image and the right-eye view image. In the autostereoscopic 3D image display device using the parallax barrier, a slit is formed in a barrier placed in front of a display panel such that a left-eye view image is blocked from the view of a right eye of a viewer and a right-eye view image is blocked from view of a left eye of the viewer.

A plurality of view points may be present in the autostereoscopic 3D image display device for multiple viewers positioned at several angles; however, as the available pixels of the display panel are used to create distinct views, the resolution of each view may be reduced for each additional view point present. For example, in the case where there are eight view points present, the resolution of each view point display may be equal to ⅛ of the total resolution of the display panel.

SUMMARY

Exemplary embodiments of the present invention may provide a technology for processing a 3D image so that the 3D image may be displayed in a high resolution, even as a single display device is used to simultaneously display multiple view points. This is accomplished by determining a portion of the 3D image that may be displayed as a 2D image and then proceeding to display that portion as a 2D image even as other portions of the same image may continue to be displayed as a 3D image.

Exemplary embodiments of the present invention may provide a technology for processing a 3D image which may reduce disharmony resulting from an abrupt change in resolution in a boundary between a 2D image portion and a 3D image portion when the 2D image portion and the 3D image portion are simultaneously displayed as part of a single image.

An exemplary embodiment of the present invention provides a 3D image display device, including a display unit which includes a display panel including pixels and displays an image. An optical panel is located at a front side of the display panel and changes a path of light. A controller is configured to generate a signal for controlling the display unit. The controller includes an image signal processor which generates an input image signal based on image information containing 2D image information and depth information. The image signal processor may generate a 3D image signal based on the 2D image information and the depth information. The image signal processor may extract a zero-depth area having a smaller absolute value of a depth than a reference value from a 3D image, and generate a 2D image signal corresponding to the zero-depth area. The display unit may display the zero-depth area as a 2D image portion.

The image signal processor may generate an input image signal, in which a part of the 3D image signal corresponding to the zero-depth area is substituted with the 2D image signal.

The image signal processor may generate a 2D image signal corresponding to an area in which pixels occluded by other areas when viewed at a 3D view position within a 3D view range are excluded from pixels included in the zero-depth area.

The image signal processor may divide the zero-depth area into a plurality of sub areas according to a depth of each area, and generate a 2D image signal which gradually decreases resolution for each of the sub areas.

The image signal processor may generate a 2D image signal which gradually decreases resolution for each of the sub areas as a depth of the sub area becomes larger.

The display panel may alternately display a 3D image and a 2D image, and the optical panel may be operated so as to change a path of light only when displaying the 3D image.

The display panel may display an area corresponding to the 2D image with black when displaying the 3D image, and display an area corresponding to the 3D image with black when displaying the 2D image.

The display panel may simultaneously display a 3D image and a 2D image, and the optical panel may be operated so as to change a path of light only in an area corresponding to the area in which the 3D image is displayed.

The controller may further include a driver configured to drive the display panel and the optical panel and a signal controller configured to control the driver.

The image signal processor may be included in the signal controller.

An exemplary embodiment of the present invention provides a method of displaying an image in a 3D image display device, which is capable of partially displaying a 2D image while simultaneously displaying a 3D image. The method includes receiving image information containing 2D image information and depth information. A zero-depth area having a smaller absolute value of a depth value than a reference value is extracted based on the depth information. A 2D image signal corresponding to the zero-depth area is generated. The 2D image is partially displayed based on the 2D image signal.

The method may further include generating a 3D image signal based on the 2D image information and the depth information.

The method may further include generating an input image signal in which a part of the 3D image signal corresponding to the zero-depth area is substituted with the 2D image signal.

The method may further include examining connectivity of pixels within the zero-depth area, and configuring a zero-depth pixel set that is a set of connected pixels. The generating of the 2D image signal may include generating a 2D image signal corresponding to the zero-depth pixel set.

The method may further include obtaining a 2D displayable pixel set in which pixels occluded by other areas, when viewed at a 3D view position within a 3D view range, are excluded from pixels included in the zero-depth area. Generating of the 2D image signal may include generating a 2D image signal corresponding to the 2D displayable pixel set.

The method may further include examining discontinuity outside and inside a boundary of the 2D displayable pixel set based on a depth and/or brightness.

The method may further include dividing the zero-depth area into a plurality of sub areas according to a depth. The generating of the 2D image signal may include generating a 2D image signal which gradually decreases resolution for each of the sub areas.

The gradual decrease of the resolution may include gradually decreasing resolution for each of the sub areas as a depth of the sub area becomes larger.

According to exemplary embodiments of the present invention, a part, which has a smaller depth and is not occluded by other areas, in a 3D image is displayed by a 2D image, thereby increasing resolution.

Further, resolution is gradually decreased according to a depth, thereby decreasing disharmony that may exist at a boundary between a 2D image and a 3D image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Hereinafter, a 3D image display device and a 3D image display device method according to an exemplary embodiment of the present invention will be described in detail with reference to the accompanying drawings. The 3D image display device may be referred to herein simply as a display device.

Figure 1:
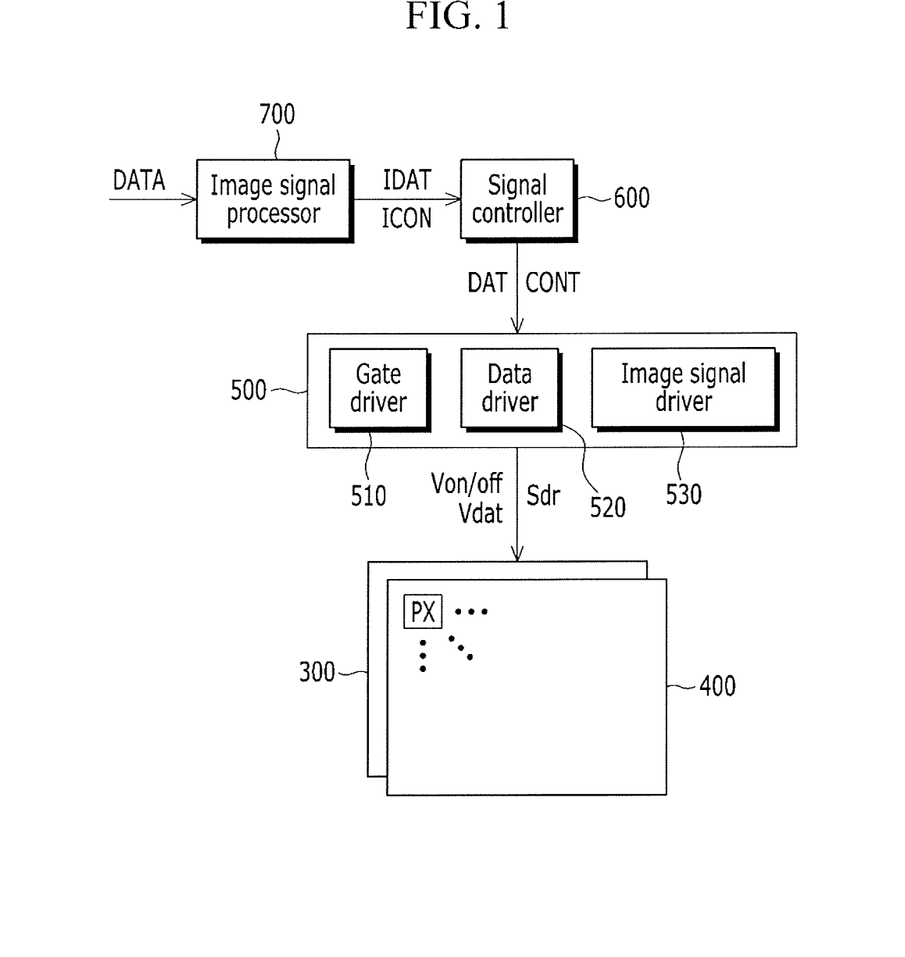
FIG. 1 is a block diagram illustrating a display device according to an exemplary embodiment of the present invention.

FIG. 1 is a block diagram illustrating a display device according to an exemplary embodiment of the present invention. FIGS. 2A and 2B are views illustrating a 2D image and depth information processed in the display device according to an exemplary embodiment of the present invention. FIG. 3 is a schematic side view illustrating a display device according to an exemplary embodiment of the present invention.

Referring to FIG. 1, a display device according to an exemplary embodiment of the present invention includes a display panel 300, an optical panel 400, a driver 500, a signal controller 600, and an image signal processor 700.

The display panel 300 displaying an image may be a liquid crystal display (LCD) panel displaying an image by adjusting an alignment direction of liquid crystal, or an organic light emitting display (OLED) panel displaying an image by using an organic light emitting diode. Alternatively, a display panel, such as a plasma display panel or an electrophoretic display panel, may be used.

The display panel 300 includes gate lines (not illustrated) transmitting a gate signal, such as a gate on voltage Von and a gate off voltage Voff. Data lines (not illustrated) transmit a data voltage Vdat. A plurality of pixels PX is connected to the gate line and the data line. The plurality of pixels is approximately arranged in a matrix form. The gate lines extend in an approximate row direction and are substantially parallel to each other. The data lines extend in an approximate column direction and are substantially parallel to each other.

The pixel PX may include a switching element, such as a thin film transistor connected to the gate line and the data line, a pixel electrode connected to the switching element, a common electrode facing the pixel electrode, and an electro-optical active layer positioned between the pixel electrode and the common electrode. The electro-optical active layer is configured to convert an electric signal to an optical signal. The liquid crystal display panel may include a liquid crystal layer as the electro-optical active layer. The organic light emitting display panel may include an organic light emitting layer. One pixel PX uniquely displays a primary color (space division), or the plurality of pixels PX alternately displays the primary colors according to time (time division), so that a desired color may be displayed by a spatial or temporal sum of the primary colors. Examples of the primary color may include three primary colors, such as red, green, and blue. A plurality of adjacent pixels PX displaying different primary colors may configure one set (referred to as a "dot"). One dot may be capable of displaying a white image or any desired color.

The optical panel 400 may change a path of light so that an image displayed on the display panel 300 may be recognized as a 3D image. For example, light emitted from each pixel PX of the display panel 300 is refracted or diffracted while passing through the optical panel 400, so that a direction of the light is changed, and a distinct 2D image enters each of a left eye and a right eye of a viewer positioned at an intended view point, so that a 3D image having depth perception may be recognized. The optical panel 400 may be located at a front side of the display panel (for example, a direction for which light emitted from the display panel 300 heads.

The display device may be an autostereoscopic display device, and a parallax barrier, a lenticular lens, or the like may be used as the optical panel 400. The optical panel 400 may be a switchable optical panel, in which the optical panel may be switched between a 3D mode displaying a 3D image and a 2D mode displaying a 2D image, so that the display device may display a 2D image, as well as a 3D image. For example, for the switchable implementation, the optical panel 400 may be a liquid crystal barrier panel in which the parallax barrier is implemented by liquid crystal, or a liquid crystal lens panel in which the lenticular lens is implemented by liquid crystal. The optical panel 400 may change a path of light passing through the liquid crystal barrier or the liquid crystal lens, or allow light to pass through the liquid crystal barrier or the liquid crystal lens as it is by adjusting alignment of the liquid crystals.

The 2D image may be partially displayed while the 3D image is displayed by time division or space division of the 3D image and the 2D image. The 2D image may be partially displayed in order to increase resolution of a corresponding portion. The portion displayed in the form of the 2D image may correspond to a zero-depth area which will be described below.

In the case of the time division, the display panel 300 may alternately display the 2D image and the 3D image, for example, for each frame. The optical panel 400 may be synchronized to the alternate display to be operated in the 2D mode and the 3D mode, so that the 2D image may be partially displayed while the 3D image is displayed. The viewer may thereby recognize the 3D image and the 2D image as being simultaneously displayed. In order to simultaneously display the 3D image and the 2D image by the time division, the display panel 300 drivable at a high speed or the optical panel 400 drivable at a high speed may be used. For example, the display panel 300 may be drivable at 120 Hz or greater.

In the case of the space division, one region (for example, a set of pixels) of the display panel 300 displays the 2D image while another region of the display panel 300 displays the 3D image. The optical panel 400 allows light to pass through for the region corresponding to the 2D image, and changes a path of light for the region corresponding to the 3D image, so that the 2D image may be partially displayed while the 3D image is displayed. The optical panel 400 may be, for example, a matrix driven optical panel, which may selectively change a path of light for a specific region of the display panel 300. For example, the liquid crystal barrier or the liquid crystal lens itself may be configured to be matrix driven. Further, the optical panel 400 may include a matrix driven polarization switching panel together with the liquid crystal lens panel.

The driver 500 may include a gate driver 510, a data driver 520, and an optical panel driver 530. However, the gate driver 510, the data driver 520, and the optical panel driver 530 need not be physically included in the driver 500. For example, the gate driver 510, the data driver 520, the optical panel driver 530, and the driver 500 may be separately present.

The gate driver 510 is connected to the gate lines of the display panel 300, and applies the gate signal, which is formed by the combination of the gate on voltage Von and the gate off voltage Voff to the gate lines.

The data driver 520 is connected to the data lines of the display panel 300, and applies a data voltage Vdat representing an output image signal DAT to the data lines. Here, the image signal may include a 3D image signal for displaying a 3D image, and a 2D image signal for displaying a 2D image.

The optical panel driver 530 applies a driving signal Sdr to signal lines (not illustrated) connected to the optical panel 400 to enable the optical panel 400 to be operated in the 3D mode and the 2D mode. In the case where the optical panel 400 is the liquid crystal lens panel, the optical panel driver 530 may apply different driving signals to the liquid crystal lens panel in the 2D mode and the 3D mode. For example, in the 2D mode, the optical panel driver 530 supplies a voltage which makes the liquid crystal lens panel allow light incident from the display panel 300 to pass through as it is. In the case where the liquid crystal lens panel is in a normally white mode, the optical panel driver 530 may block power supply in the 2D mode. In the 3D mode, the optical panel driver 530 supplies a voltage which forms a distribution, in which a phase is delayed according to a Fresnel zone plate, for each liquid crystal lens of the liquid crystal lens panel and separates a visual field of an image of the display panel 300.

The signal controller 600 controls operations of the gate driver 510, the data driver 520, the optical panel driver 530, and the like, and processes an input image signal IDAT to transmit the output image signal DAT to the driver 500. The input image signal IDAT input to the signal controller 600 is an output signal of the image signal processor 700. The input image signal IDAT contains information on luminance, and the luminance may include a predetermined number of grays. The input image signal IDAT may include a 2D input image signal for displaying a 2D image, and a 3D input image signal for displaying a 3D image.

The image signal processor 700 receives image information DATA and the like from an external device, processes the received image information DATA and the like, and transmits the processed image information DATA to the signal controller 600. The image information DATA may contain information about the type of image, such as whether an image to be displayed is a 2D image or a 3D image. In the case of the 3D image, the image information DATA may include 2D image information and depth information.

Referring to FIGS. 2A and 2B, the 2D image information is information about the image display deviceed by all of the pixels PX of the display panel 300, and the depth information represents information on depth of the 2D image, for example, a level of protrusion or depression of each portion if the image. The depth information contains a depth map representing a level of depth of the 2D image. Each point of the depth map may have the depth information and unique 3D coordinates by 2D position information on each point. In FIGS. 2A and 2B, the depth information is indicated by light and shade, and as a portion is brighter (or a portion has a color close to white), the portion corresponds to a more protruding portion, and as a portion is darker (or the portion has a color close to black), the portion corresponds to a more depressed portion. Alternatively, lighter colors may represent more depressed portions while darker colors may represent more protruding portions.

The image signal processor 700 generates the input image signal IDAT and an input control signal ICON controlling display of the input image signal IDAT based on the image information DATA to transmit the generated signals to the signal controller 600. The input control signal ICON may include a horizontal synchronization signal Hsync, a vertical synchronization signal Vsync, a main clock MCLK, a data enable signal DE, and the like. The image signal processor 700 may be positioned inside the signal controller 600.

Referring to FIG. 3, an exemplary embodiment, in which the liquid crystal lens panel is used as the optical panel 400, is illustrated. The 3D image is displayed by the 3D image display device using binocular disparity and may include a region, which appears very much like a 2D image because a depth disparity between left and right eye images is relatively small. For example, the depth of the region may be close to zero, and may be referred to as a "zero-depth area" in the present specification. The zero-depth area may be defined as a region having a small absolute value of the depth, and a reference value thereof may vary according to a design.

The region corresponding to the zero-depth area in the 3D image is a region in which disparity may correspond to a width of one 3D pixel, for example, the disparity between the position of an object in the left eye image and the right eye image may be as little as a single pixel and the disparity may be similar to, for example, a width w of the lenticular lens 410. When disparity has a size level of the 3D pixel, the 2D image is not shifted compared to the 3D image when the 2D image is displayed. When the region is displayed by the 2D image, it is possible to prevent resolution from deteriorating due to the display of the 3D image, thereby achieving high resolution of the corresponding region.

When the zero-depth area in the 3D image is simply replaced with the 2D image, resolution may be abruptly changed at a boundary between the 2D image and the 3D image, thereby causing a disharmony problem and degrading uniformity of the image. According to an exemplary embodiment of the present invention, a gradual resolution decrease method may be applied to the 2D image corresponding to the zero-depth area.

Figure 4:
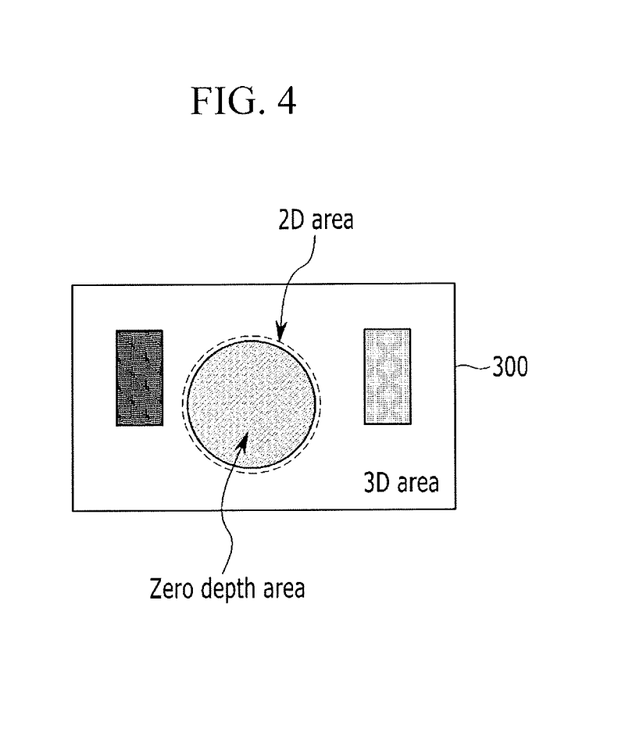
FIGS. 4 and 5 are views illustrating an example of a method in which a 2D image is partially displayed while a 3D image is displayed according to an exemplary embodiment of the present invention.
Figure 5:
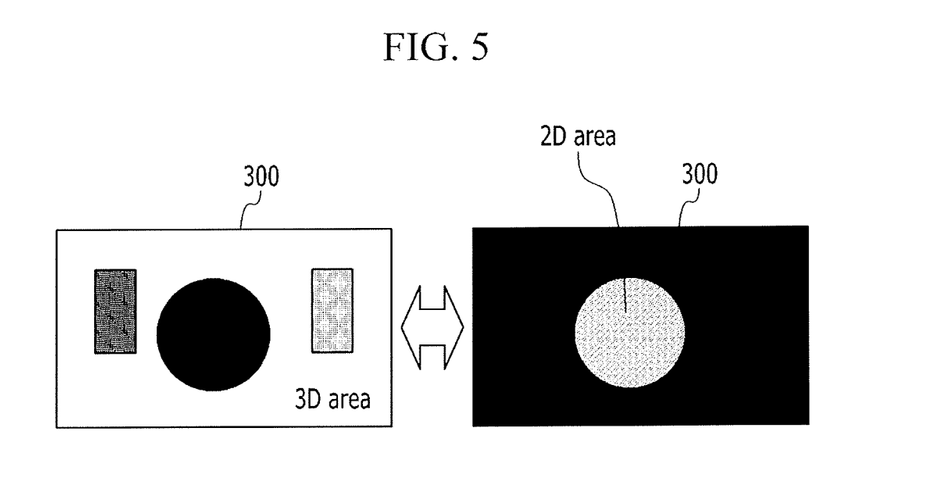

FIGS. 4 and 5 are views illustrating an example of a method in which a 2D image is partially displayed while a 3D image is displayed. FIG. 4 illustrates an example in which a 2D image and a 3D image are simultaneously displayed on one screen, and FIG. 5 illustrates an example in which a 2D image and a 3D image are alternately displayed with a time difference.

First, referring to FIG. 4, a 2D image and a 3D image are simultaneously displayed on the display panel 300 through the space division of the 2D area and the 3D area. Here, the 2D area may correspond to the zero-depth area. The simultaneous display of the 2D image and the 3D image may be implemented by using a matrix driven optical panel as the optical panel 400 to the display device. For example, in the case where the optical panel 400 is a matrix type liquid crystal barrier panel, rather than a strip type liquid crystal barrier panel, a liquid crystal barrier in the liquid crystal barrier panel region corresponding to a display area of the 3D image is turned on, and a liquid crystal barrier of an area corresponding to a display area of the 2D image is turned off, so that the 3D image and the 2D image may be simultaneously displayed.

As an example, in the case where the optical panel 400 includes the liquid crystal lens panel and the polarization switching panel, in the state where the liquid crystal lens of the liquid crystal lens panel are turned on, polarized light parallel to a liquid crystal alignment of the liquid crystal lens is input into an area corresponding to a display area of the 3D image, and polarized light perpendicular to the liquid crystal alignment of the liquid crystal lens is input into an area corresponding to a display area of the 2D image through the matrix driving of the polarization switching panel, so that the 3D image and the 2D image may be simultaneously displayed.

Referring to FIG. 5, for example, by the display device including the display panel drivable at a high speed and the liquid crystal lens panel drivable at a high speed, the 2D image may be partially displayed while the 3D image is displayed, through the time division of the 3D image and the 2D image. When the display panel 300 alternately displays the 3D image and the 2D image and simultaneously turns on/off the liquid crystal lens panel at a speed corresponding to that of the alternate display, the 3D image and the 2D image are mixed with each other.

For example, in an odd numbered frame, the 3D image is displayed at a position in the display panel 300, at which the 3D image is desired to be displayed, and black is displayed at a position at which the 2D image is desired to be displayed. In this case, the liquid crystal lens is in an on state. In an even numbered frame, the 2D image is displayed at a position in the display panel 300, at which the 2D image is desired to be displayed, and black is displayed at a position at which the 3D image is desired to be displayed. In this case, the liquid crystal lens is in an off state. When the display panel is driven so that the 3D image and the 2D image are alternately and rapidly displayed, a viewer may recognize as if the 3D image and the 2D image are simultaneously displayed on one screen.

Hereinafter, a 2D image partial display and a gradual resolution decrease method according to the exemplary embodiment of the present invention will be described.

Figure 6:
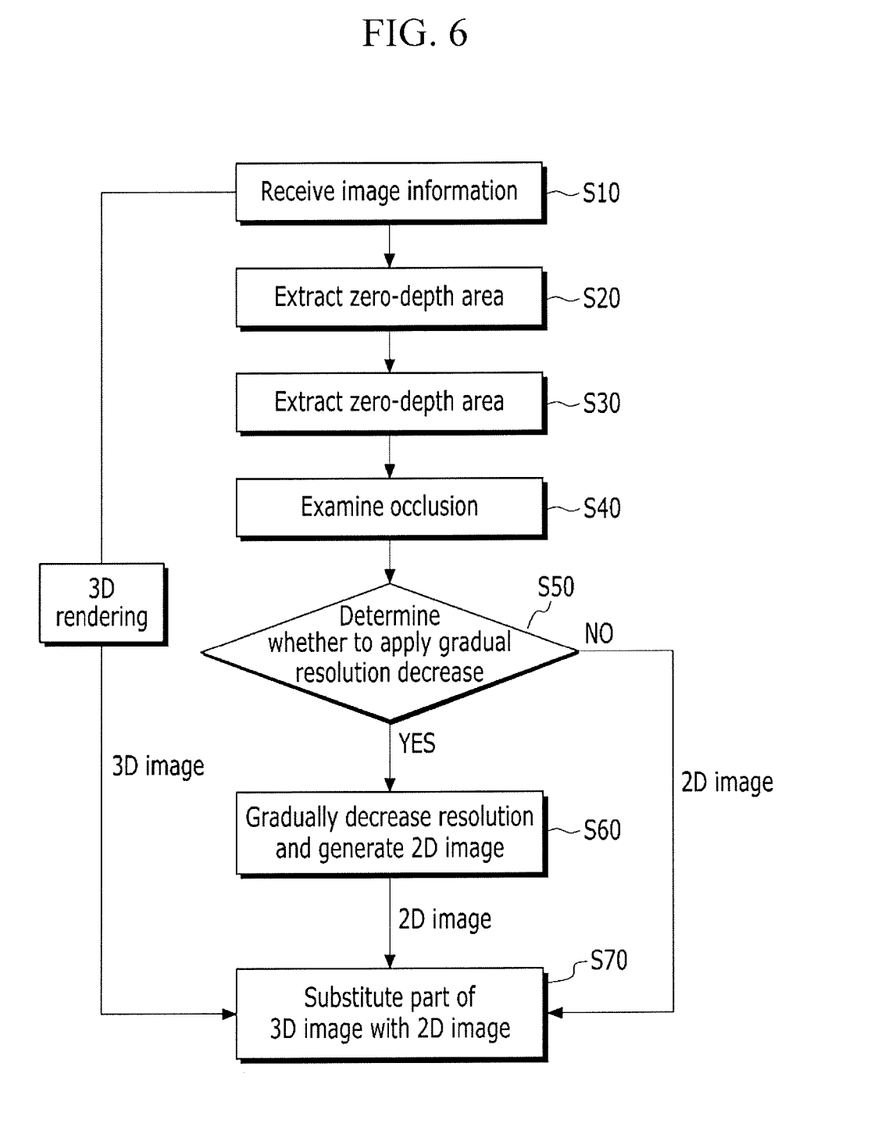
FIG. 6 is a flowchart illustrating a method of processing image information in the display device according to an exemplary embodiment of the present invention.
Figure 7:
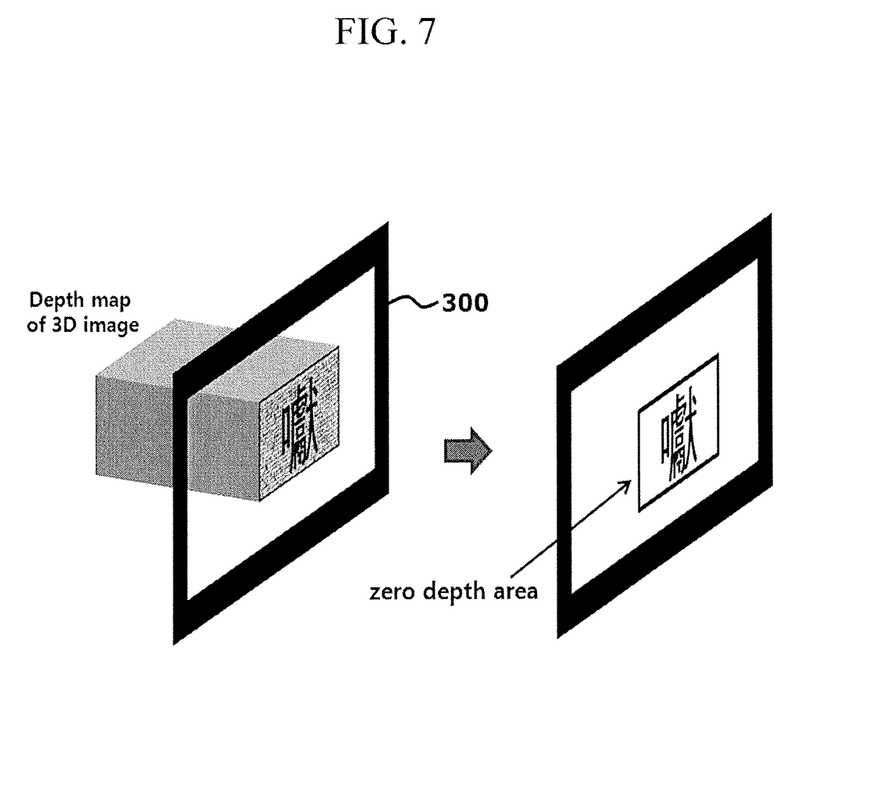
FIGS. 7 and 8 are views illustrating a 2D image partial display, and an application of a gradual resolution decrease according to an exemplary embodiment of the present invention.
Figure 8:
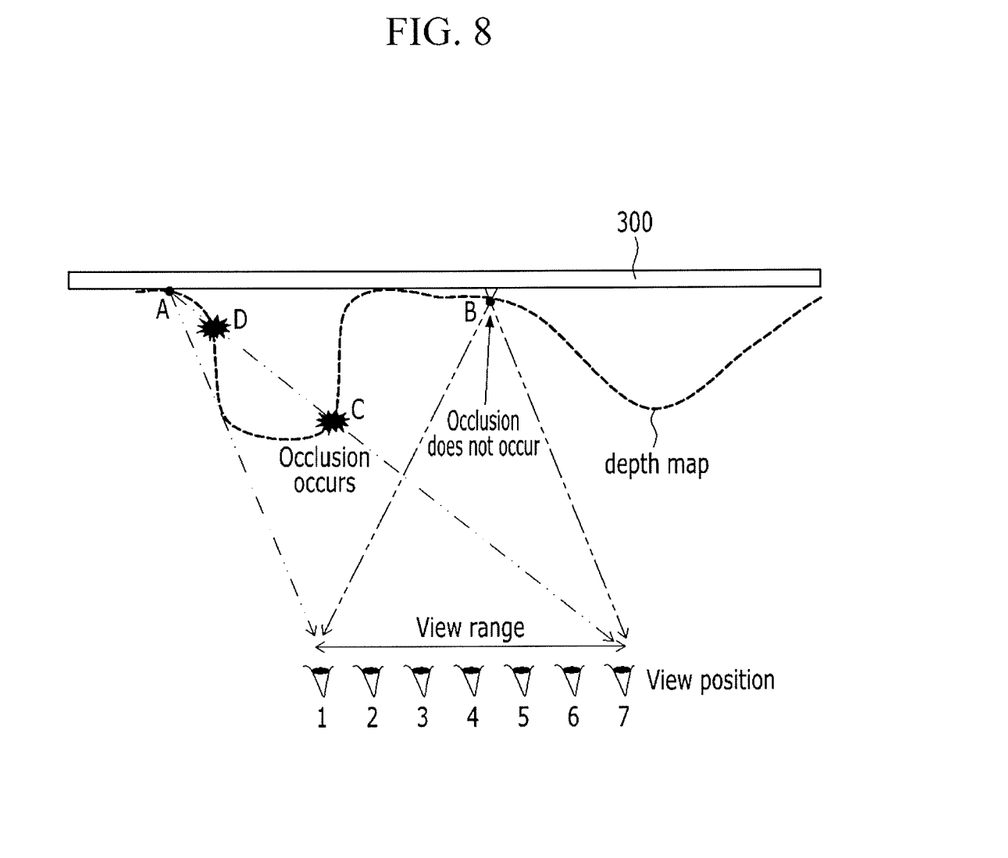
Figure 9:
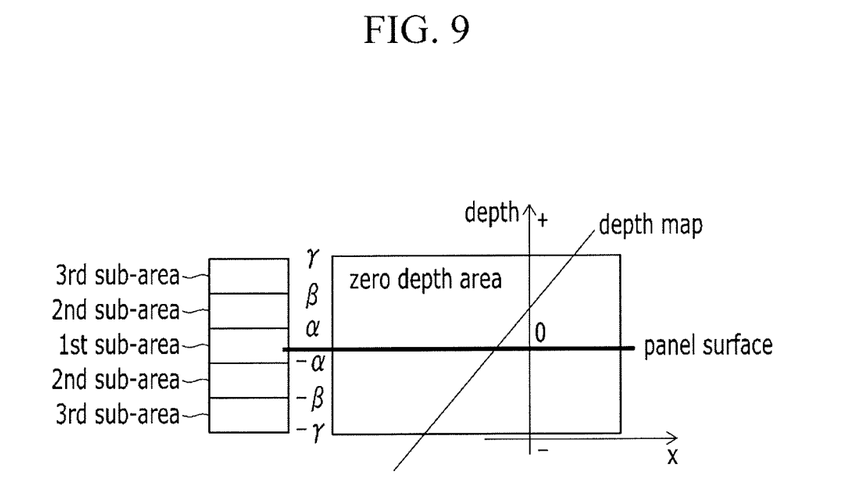
FIGS. 9 and 10A to 10C are views illustrating an example in which a zero-depth area is divided into sub areas and resolution is gradually decreased according to an exemplary embodiment of the present invention.
Figure 10:
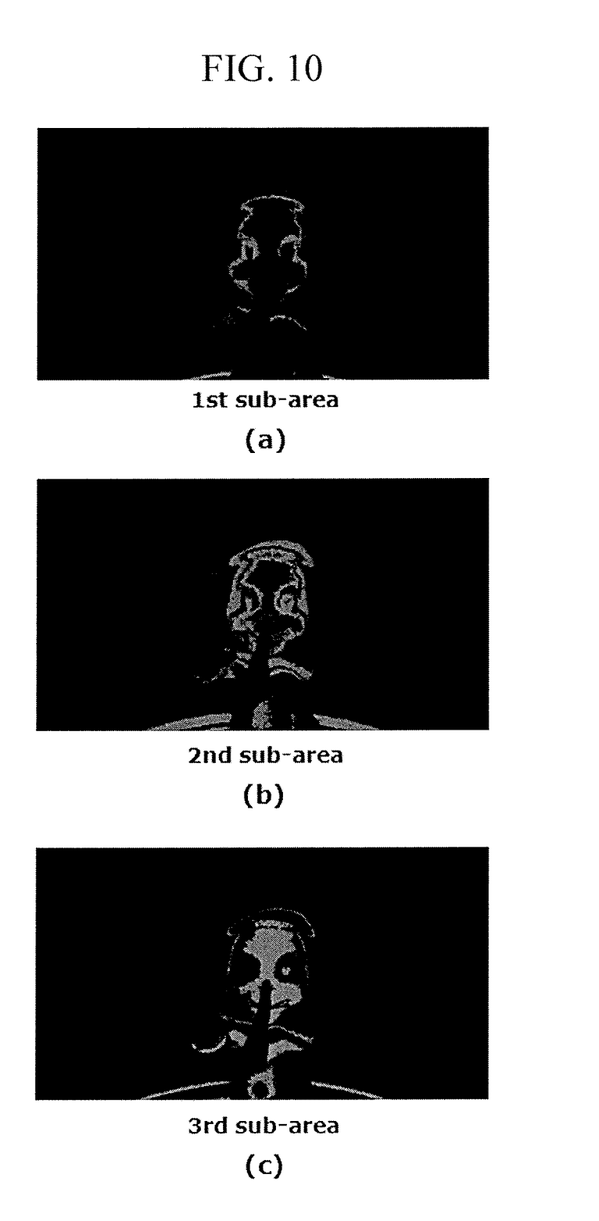

FIG. 6 is a flowchart illustrating a method of processing image information in the display device according to an exemplary embodiment of the present invention. FIGS. 7 and 8 are views related to a 2D image partial display, and determination as to whether to apply a gradual resolution decrease according to the exemplary embodiment of the present invention, and FIGS. 9 and 10 are views illustrating an example in which a zero-depth area is divided into sub areas in a gradual resolution decrease method according to an exemplary embodiment of the present invention.

Referring to FIG. 6, image information is received (S10). In the case where input information DATA is a signal for displaying a 3D image that is provided from an external source, the input information DATA may contain 2D image information and depth information.

In general, 3D image information contains the 2D image information and depth information, where depth information is data about a depth at each portion of the 2D image. For example, the 3D image information is information obtained by adding a depth to the 2D image so as to make the 2D image appear to be three-dimensional. In the case where the depth information is present, the image signal processor 700 of the display device renders a 3D image signal for displaying a 3D image. The 3D image signal may be transmitted to the signal controller 600 as the input image signal IDAT. A rendering method includes a method of generating a 3D image based on the 2D image information and the depth information. The signal controller 600 controls the driver 500 so as to display an image according to the input image signal IDAT. In an exemplary embodiment of the present invention, the input image signal IDATA may be an input image signal in which a part of the 3D image is substituted with the 2D image.

In the case where the image information does not contain the depth information, the signal controller 600 of the display device receives a 2D input image signal IDAT for displaying the 2D image and controls the driver 500 to display the 2D image.

In the case where the image information contains the depth information, a depth is analyzed, and a zero-depth area is extracted based on the depth information (S20). As described above, the zero-depth area is an area of which a depth is at or close to zero and where there is a small disparity between left and right eye images. Referring to FIG. 7, the zero-depth area may be an area having a relatively small level of protrusion or depression with respect to a reference depth, and these regions may be 2-dimensionally displayed. The image signal processor 700 generates an image signal (hereinafter, referred to as a "3D image signal") for displaying a 3D image by rendering based on the image information. The generated image signal may be stored in a memory (not illustrated) located inside or outside the image signal processor 700.

After the zero-depth area is obtained, connectivity of the pixels within the zero-depth area is examined to configure a set of connected pixels (S30). The set of pixels may be referred to herein as a "zero-depth pixel set". A plurality of zero-depth areas, which are separated from each other, may be present in the 3D image, and in this case, each zero-depth area includes a separate zero-depth pixel set. A subsequent process may be performed on each zero-depth pixel set.

After the zero-depth pixel set is configured, occlusion of each pixel in the zero-depth pixel set is examined (S40). Referring to FIG. 8, in the case where both pixel A and pixel B are positioned in the zero-depth area, pixel A is not occluded at 3D view position 1 within a 3D view range, but is occluded at 3D view positions 2 to 7 by other pixels (for example, pixels C and D) protruding toward a 3D space. However, pixel B is not occluded at all of view positions 1 to 7 within the 3D view range. The 3D view range and the 3D view position may be determined during a design of the display device.

The generation of occlusion means that a corresponding pixel needs to be differently viewed for each view position. Accordingly, if a pixel is occluded even though the pixel is included in the zero-depth pixel set, the pixel may not be considered as a 2D pixel, and may be inappropriate for 2-dimensional display. Whether the pixel is occluded may be verified by a ray tracing method according to a view position within a view range for each pixel, and the like. A set of pixels satisfying both the zero-depth area condition and a non-occlusion condition may be referred to herein as a "2D displayable pixel set". The 2D displayable pixel set may be a set in which the occluded pixel is excluded from the zero-depth pixel set.

Next, whether to apply a gradual resolution decrease to the 2D displayable pixel set is determined (S50). Operation S50 may be performed by examining discontinuity inside and outside a boundary based on a boundary between the 2D displayable pixel sets. Referring to FIG. 7, a depth is abruptly changed or brightness is abruptly changed around a boundary line of the connected pixel sets, and content discontinuity may occur between the 2D displayable pixel set and an outside area of the 2D displayable pixel set (3D display pixel set). The 2D displayable pixel set has little disharmony generated at the boundary, so that the 2D displayable pixel set may be 2-dimensionally displayed as it is. For example, the 2D displayable pixel set may be 2-dimensionally displayed as it is when a depth is abruptly changed so that an object is clearly discriminated, like a background and a foreground object, and in this case, it is not necessary to apply the gradual resolution decrease.

A change level, at which it is determined that a depth or brightness is abruptly changed, may be set by a parameter. For example, the case where a difference in luminance between inside and outside the boundary line is equal to or greater than a predetermined grayscale may be determined as the case where brightness is abruptly changed, and the predetermined grayscale may be set according to a design. The same may be applied to a difference in depth between inside and outside the boundary line.

Resolution may then be gradually decreased for the 2D displayable pixel set, to which the gradual resolution decrease has been determined to be applied, to generate the 2D image (S60). Operation S60 may include dividing the zero-depth area including the 2D displayable pixel set into a plurality of sub areas according to a depth, and gradually decreasing resolution of each sub area according to a depth. Resolution of a sub area, of which resolution is most decreased, may be the same as or higher than the resolution of the 3D image. For the 2D displayable pixel set, to which the gradual resolution decrease is not applied, the 2D image signal may be directly generated from the 2D image information about a corresponding area.

Referring to FIG. 9, an example in which the zero-depth area indicated by a large quadrangle is divided into three sub areas according to a level of a depth is illustrated. Here, a first sub area is an area having the smallest depth, a second sub area is an area having a larger depth than that of the first sub area, and a third sub area is an area having the largest depth. A level of the depth may be determined based on an absolute value of a protruding (−) or depressed (+) distance based on a surface of which a depth is zero.

For example, the first sub area may be an area from a portion protruding by α from a panel surface to a portion depressed by α from the panel surface. The second sub area includes an area protruding by a range of α to β from the panel surface (the second sub area positioned under the first sub area), and an area depressed by a range of α to β from the panel surface (the second sub area positioned above the first sub area). The third sub area includes an area protruding by a range of β to γ from the panel surface (the third sub area positioned under the second sub area), and an area depressed by a range of β to γ from the panel surface (the third sub area positioned above the second sub area). Here, α<β<γ.

Figure 2:
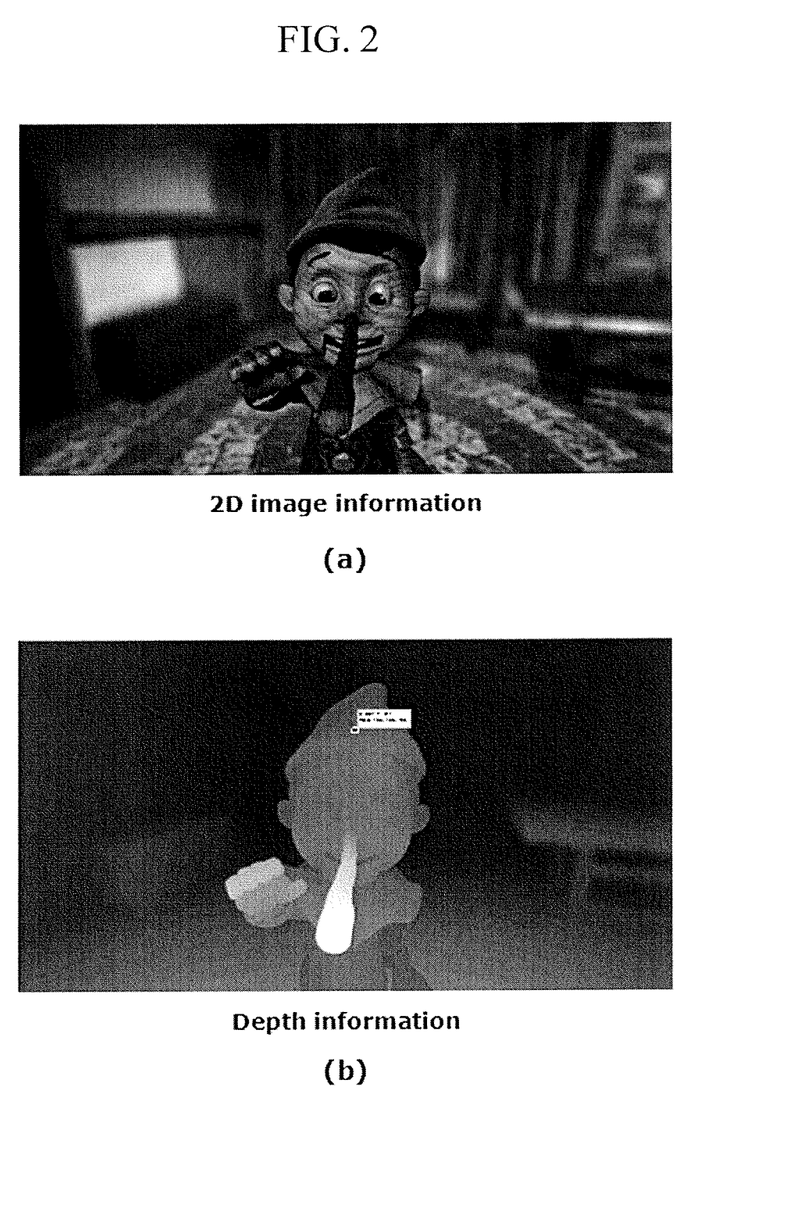
FIGS. 2A and 2B are views illustrating a 2D image and depth information processed in the display device according to an exemplary embodiment of the present invention.
Figure 3:
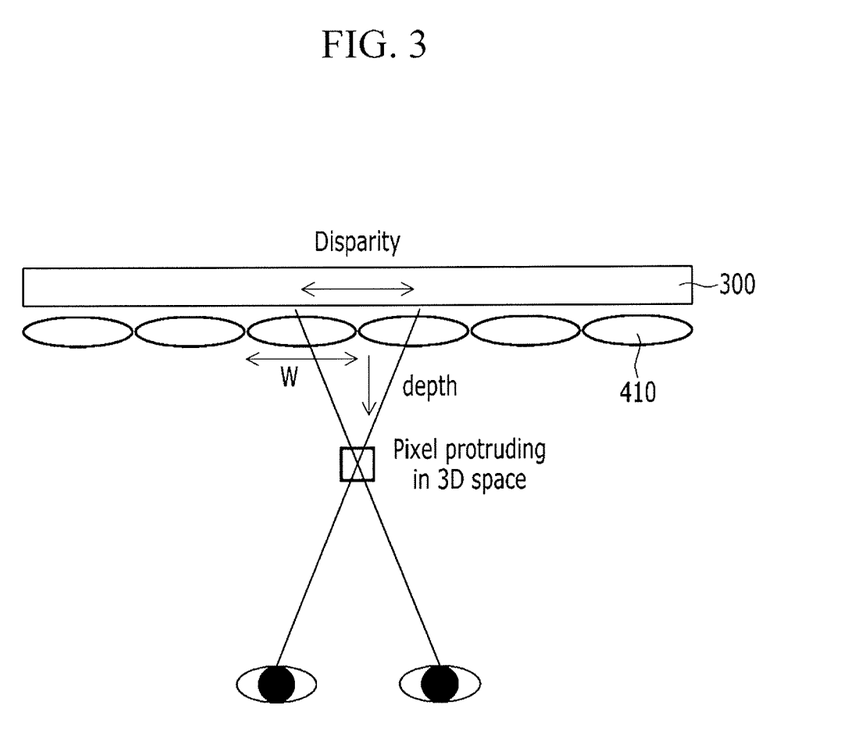
FIG. 3 is a schematic side view illustrating a display device according to an exemplary embodiment of the present invention.

FIGS. 10A to 10C illustrate an example in which the zero-depth area is extracted based on the 2D image information and the depth information illustrated in FIG. 2, and then is divided into three sub areas. The character Pinocchio is illustrated in this figure. The zero-depth area may be a face area of Pinocchio except for a protruding nose. Referring to the depth information illustrated in FIG. 2, the nose elongating in the face of the Pinocchio is displayed to be bright, and accordingly the nose protrudes at a large level compared to other portions of the image. Most of the regions of the face, except for the elongating nose, have little disparity, thereby corresponding to the zero-depth areas.

In FIG. 10, the topmost drawing (a) illustrates the first sub area, a center drawing (b) illustrates the second sub area, and the lowest drawing (c) illustrates the third sub area, and each of the sub areas is indicated by gray. The first sub area is the area least protruding or depressed based on a zero depth, the second sub area is the area more protruding or depressed than the first sub area, and the third sub area is the most protruding or depressed area. For example, pixels occluded by the nose of the Pinocchio may be excluded from the pixels included in the sub areas.

The gradual resolution decrease according to the depth for each sub area may be achieved by minimally decreasing or not decreasing the resolution for the sub area having the smallest depth. The resolution for the sub area having the larger depth may be further decreased as compared to the sub area having the smaller depth. For example, the resolution of the first sub area may be maintained, the resolution of the second sub area may be decreased to ¼, and the resolution of the third area may be decreased to ⅑. Resolution of the sub area may be decreased using methods such as a resizing. For example, when the second sub area is resized by ½, and then is resized two times, the resolution of the second sub area is decreased to ¼. Similarly, when the third sub area is resized by ⅓, and then is resized three times, the resolution of the third sub area is decreased to ⅑.

When the sub areas, of which the resolution is gradually decreased, are composed into one area, an image of the zero-depth area, which is to be 2-dimensionally displayed, is completed, and thus, it is possible to generate a converted 2D image signal in which resolution is gradually decreased.

When the converted 2D image signal is generated, a part corresponding to the 2D displayable pixel set in the 3D image signal generated by the rendering may be substituted with the converted 2D image signal (S70). Accordingly, the input image signal IDAT includes the image signal in which the 3D image is partially substituted with the 2D image. Here, the substituted image signal may be understood to be an image signal which displays the 2D image in an area in which the 2D image is to be displayed, and displays the 3D image in the remaining areas when the image is displayed on the display panel 300. For the 2D displayable pixel set to which it is determined that the gradual resolution decrease is not to be applied in operation S50 of determining whether to apply the gradual resolution decrease, the portion corresponding to the 3D image signal is substituted with the non-converted 2D image signal for the corresponding area.

A series of operations S10 to S70 may be performed by, for example, the image signal processor 700 of the display device. The image signal processor 700 may include a detailed configuration for performing each procedure, and may include a memory for storing a program for performing the procedure. At least one of operations S30 to S50 may be omitted, and in this case, a subsequent operation of an omitted operation may be performed on an output of a previous operation.

FIGS. 11A to 11D are views illustrating a result of applying the gradual resolution decrease method according to an exemplary embodiment of the present invention.

Figure 11:
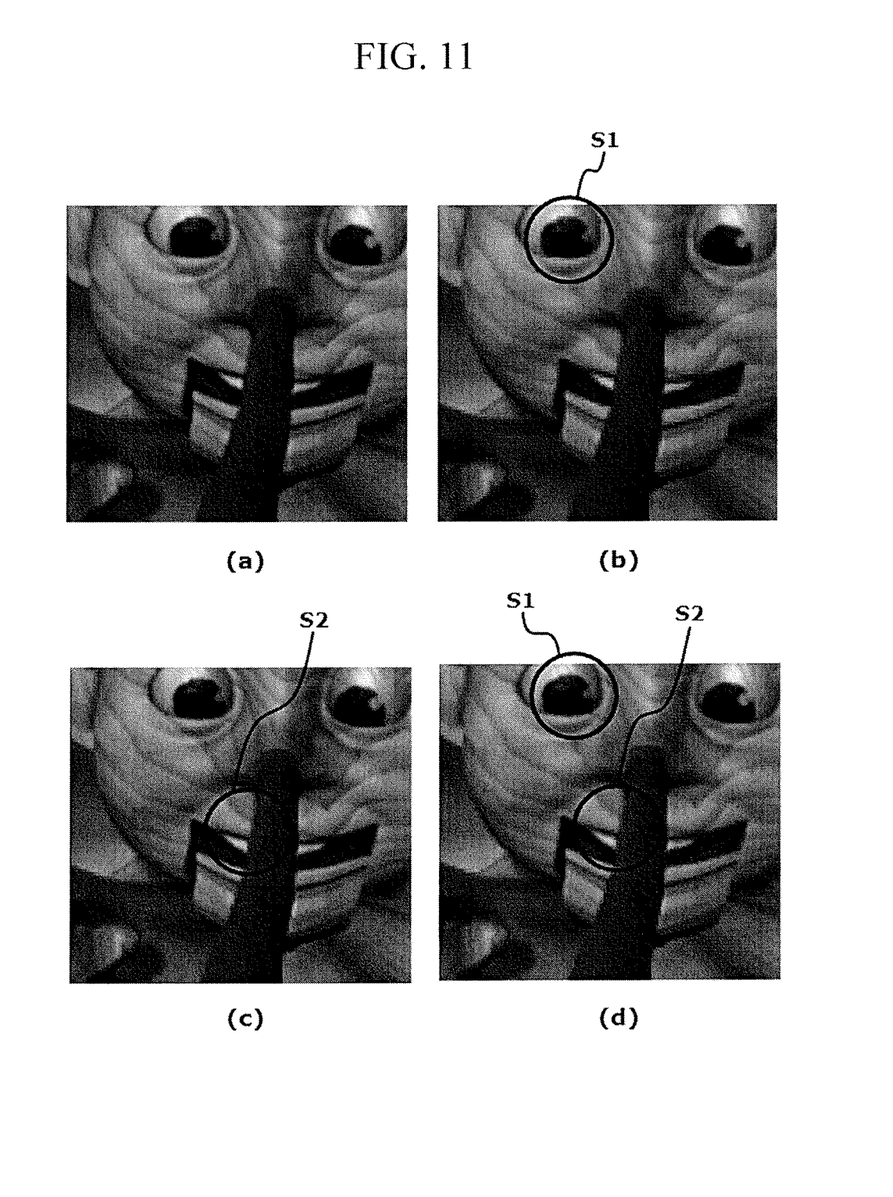
FIGS. 11A to 11D are views illustrating a result of applying a gradual resolution decrease method according to an exemplary embodiment of the present invention.

FIG. 11A is a 2D image that is an original image, FIG. 11B is a 3D image in which resolution is decreased to ⁄1;9, FIG. 11C is an image obtained by substituting a zero-depth area in the 3D image with a 2D image, and FIG. 11D is an image obtained by substituting the zero-depth area in the 3D image of FIG. 11B with a 2D image to which the gradual resolution decrease is applied.

In the case of the 3D image (FIG. 11B), resolution is decreased in all of the areas compared to the original 2D image (FIG. 11A). For example, referring to a pupil area S1, a soft pupil border in the original 2D image (FIG. 11A) is roughly expressed as a lattice. When the portions corresponding to the zero-depth area, except for an elongating nose, in the 3D image (FIG. 11B) are substituted with a 2D image, the elongating nose is 3-dimensionally displayed to provide a 3D effect, and the remaining areas are 2-dimensionally displayed, so that resolution may not deteriorate (the substituted image (FIG. 11C)). However, resolution is abruptly changed in a boundary S2 between the 2D image and the 3D image (9 times), thereby increasing disharmony. Referring to the substituted image (FIG. 11D), when the resolution is gradually and naturally decreased according to an increase in a depth for the zero-depth area, the resolution of the pupil area S1 is increased compared to the 3D image, but there is no or little change in the resolution at the boundary S2, thereby decreasing disharmony.

As described above, according to exemplary embodiments of the present invention, an area, which has a small depth and is not occluded by another area, in a 3D image is displayed by a 2D image, thereby increasing resolution. There is a possibility that a portion of the image having a large depth may appear blurred to a certain extent by an effect of focus deviation. There is a possibility that the zero-depth area having a good focus contains a large amount of image information, so that an increase in resolution is meaningful. Particularly, in the image rendering, in which a minimum depth is zero or maximum, that is, the rendering method in which an object only protrudes or is depressed in a screen, there is a probability that a background or a foreground object is located in the zero-depth area, so that there is room for increasing resolution for the 2D image.

When the zero-depth area is simply replaced with the 2D image, disharmony may occur at the boundary between the 2D image and the 3D image. Accordingly, if the zero-depth area is replaced with the 2D image of which resolution is gradually decreased according to a depth, it is possible to decrease disharmony. However, in the case where the 2D image and the 3D image are discontinued, for example, the zero-depth area protrudes or is depressed compared to an outside area thereof based on a boundary of the 2D image, or the zero-depth area is white and the outside area thereof is black, or vice versa, the gradual resolution decrease may be omitted to achieve an optimum effect.

While exemplary embodiments of the present invention have been described with reference to the figures, it is to be understood that the invention is not limited to the disclosed embodiments, but, on the contrary, is intended to cover various modifications and equivalent arrangements.

What is claimed is:

1. A 3D image display device, comprising:
a display unit including a display panel and an optical panel, the display panel including a plurality of pixels and the optical panel disposed at a front side of the display panel and configured to selectively change a path of light emanating from the display panel; and
a controller configured to generate a signal for controlling the display unit,
wherein the controller includes an image signal processor generating an input image signal based on image information including two-dimensional (2D) image information and depth information, wherein the image signal processor generates a three-dimensional (3D) image signal based on the 2D image information and the depth information,
wherein the image signal processor extracts a low-depth area having a smaller absolute value of a depth than a reference value and generates a 2D image signal corresponding to the low-depth area, and
wherein the display unit displays the low-depth area as a 2D image,
wherein the image signal processor divides the low-depth area into a plurality of sub areas according to a depth thereof, and generates the 2D image signal which gradually decreases resolution for each of the sub areas, and
wherein the image signal processor generates the 2D image signal which gradually decreases resolution for each of the sub areas as a depth of the sub area becomes larger to smooth the resolution difference at a boundary between the 2D image and a displayed 3D image.

2. The 3D image display device of claim 1, wherein the image signal processor generates an input image signal, in which a part of the 3D image signal corresponding to the low-depth area is substituted with the 2D image signal.

3. The 3D image display device of claim 2, wherein the image signal processor generates the 2D image signal corresponding to an area in which pixels occluded by other areas when viewed at a 3D view position within a 3D view are excluded from pixels included in the low-depth area.

4. The 3D image display device of claim 2, wherein the display panel alternately displays a 3D image and a 2D image, and the optical panel changes a path of light only when displaying the 3D image.

5. The 3D image display device of claim 4, wherein the display panel replaces an area corresponding to the 2D image with black when displaying the 3D image, and replaces an area corresponding to the 3D image with black when displaying the 2D image.

6. The 3D image display device of claim 2, wherein the display panel simultaneously displays a 3D image and a 2D image, and the optical panel changes a path of light only in an area corresponding to the area in which the 3D image is displayed.

7. The 3D image display device of claim 1, wherein the controller further comprises:
a driver configured to drive the display panel and the optical panel; and
a signal controller configured to control the driver.

8. The 3D image display device of claim 7, wherein the image signal processor is included in the signal controller.

9. A method of displaying an image in a 3D image display device, the method comprising:
receiving image information containing two-dimensional (2D) image information and depth information;
generating a 3D image signal from the 2D image information and the depth information; identifying a low-depth area from the depth information;
generating a 2D image signal from the 2D image information corresponding to the low-depth area;
simultaneously displaying the 2D image signal and a portion of the 3D image signal,
the method further comprising:
dividing the low-depth area into a plurality of sub areas according to a depth thereof,
wherein the generating of the 2D image signal includes generating a 2D image signal which gradually decreases resolution for each of the sub areas, and
wherein the gradually decreasing the resolution includes gradually decreasing resolution for each of the sub areas as a depth of the sub area becomes larger to smooth the resolution difference at a boundary between the 2D image signal and the displayed portion of the 3D image signal.

10. The method of claim 9, further comprising generating an input image signal in which a part of the 3D image signal corresponding to the low-depth area is substituted with the 2D image signal.

11. The method of claim 9, further comprising examining connectivity of pixels within the low-depth area, and configuring a low-depth pixel set that is a set of connected pixels, wherein the generating of the 2D image signal includes generating a 2D image signal corresponding to the low-depth pixel set.

12. The method of claim 11, further comprising obtaining a 2D displayable pixel set in which pixels occluded by other areas when viewed at a 3D view position within a 3D view range are excluded from pixels included in the zero-depth area, wherein the generating of the 2D image signal includes generating a 2D image signal corresponding to the 2D displayable pixel set.

13. The method of claim 12, further comprising examining discontinuity outside and inside a boundary of the 2D displayable pixel set based on at least one of a depth and brightness.

14. A method for displaying an image, including:
receiving a three-dimensional (3D) image signal including a two-dimensional (2D) image signal and depth information;
identifying a region of the 3D image signal having a low depth based on the depth information, wherein low depth is defined as depth below a predetermined threshold;
removing the low depth region from the 3D image signal;
displaying the low depth-removed 3D image signal in 3D at a first resolution;
displaying the low depth region in 2D at a second resolution greater than the first resolution,
the method further comprising:
dividing the low-depth region into a plurality of sub areas according to a depth thereof,
wherein the 2D image signal gradually decreases resolution for each of the sub areas, and
wherein the gradually decreasing the resolution includes gradually decreasing resolution for each of the sub areas as a depth of the sub area becomes larger to smooth the resolution difference at a boundary between the low depth region in 2D and the displayed low depth-removed 3D image.

15. The method of claim 14, wherein the low depth-removed 3D image signal and the low depth region are displayed simultaneously.

16. The method of claim 14, wherein the low depth-removed 3D image signal and the low depth region are displayed in alternating frames.

* * * * *